United States Patent
Wang et al.

(10) Patent No.: US 11,093,992 B2
(45) Date of Patent: Aug. 17, 2021

(54) SMART MATCHING FOR REAL ESTATE TRANSACTIONS

(71) Applicants: James Wang, Duluth, GA (US); Siddharth Biswal, Duluth, GA (US)

(72) Inventors: James Wang, Duluth, GA (US); Siddharth Biswal, Duluth, GA (US)

(73) Assignee: REAI INC., Duluth, GA (US)

( * ) Notice: Subject to any disclaimer, the term of this patent is extended or adjusted under 35 U.S.C. 154(b) by 109 days.

(21) Appl. No.: 15/970,188

(22) Filed: May 3, 2018

(65) Prior Publication Data
US 2018/0253780 A1 Sep. 6, 2018

Related U.S. Application Data

(60) Provisional application No. 62/502,346, filed on May 5, 2017.

(51) Int. Cl.
*G06Q 30/00* (2012.01)
*G06Q 30/06* (2012.01)
(Continued)

(52) U.S. Cl.
CPC ..... *G06Q 30/0631* (2013.01); *G06Q 30/0627* (2013.01); *G06Q 30/0641* (2013.01);
(Continued)

(58) Field of Classification Search
None
See application file for complete search history.

(56) References Cited

U.S. PATENT DOCUMENTS

2005/0288958 A1* 12/2005 Eraker ............... G06Q 30/0601
  705/316
2014/0358943 A1* 12/2014 Raymond ............. G06Q 10/10
  707/748

(Continued)

OTHER PUBLICATIONS

"Wang, Xiang, Item Silk Road: Recommending Items from Information Domains to Social Users, Aug. 7-11, 2017, SIGIRfi17, NPL pp. 1-10" (Year: 2017).*

(Continued)

*Primary Examiner* — William J Allen
*Assistant Examiner* — Maria S. P. Heath
(74) *Attorney, Agent, or Firm* — F. Chau & Associates, LLC

(57) ABSTRACT

Systems and methods are described for efficiently meeting the needs of property buyers, sellers, and agents. Attributes of the user and of each property are combined and processed by a machine learning model. The output represents a prediction that a user will choose to view the property. Each property is ranked and displayed to the user. When the user selects a property, the interaction is used to update the machine learning model. In some cases, a natural language processing system identifies property and user attributes based on a natural language query. In some cases, a chatbot may respond to a natural language query in real time. The system may also be utilized to provide matching services for buyers or sellers to agents, or third party service providers, as well as matching buyers and sellers directly to each other, or user to other users for transaction, interaction and other needs.

20 Claims, 12 Drawing Sheets

(51) Int. Cl.
*G06Q 50/16* (2012.01)
*H04L 12/58* (2006.01)
*H04L 29/08* (2006.01)
*G06Q 50/00* (2012.01)

(52) U.S. Cl.
CPC ............ *G06Q 50/16* (2013.01); *H04L 51/02* (2013.01); *H04L 51/32* (2013.01); *H04L 67/22* (2013.01); *H04L 67/306* (2013.01); *G06Q 50/01* (2013.01)

(56) References Cited

U.S. PATENT DOCUMENTS

| | | | |
|---|---|---|---|
| 2015/0088788 A1* | 3/2015 | Traupman | G06N 7/005 706/11 |
| 2015/0161200 A1* | 6/2015 | Barba | G06Q 50/16 705/313 |
| 2015/0242747 A1* | 8/2015 | Packes | G06Q 50/16 706/17 |
| 2015/0324939 A1* | 11/2015 | Malaviya | H04L 67/20 705/14.66 |
| 2016/0343058 A1* | 11/2016 | Levy | G06Q 30/0631 |
| 2018/0096073 A1* | 4/2018 | Sun | G06Q 50/01 |
| 2018/0285748 A1* | 10/2018 | Husain | G06N 20/00 |

OTHER PUBLICATIONS

Yuyu, Zhang, Sequential Click Prediction for Sponsored Search with Recurrent Neural Networks, 2014, Proceedings of the National Conference on Artificial Intelligence. 2. (Year: 2014).*

* cited by examiner

SMART MATCHING FOR REAL ESTATE TRANSACTIONS

CROSS-REFERENCE TO RELATED APPLICATION

This application claims priority to, and the benefit of, U.S. Provisional Application Ser. No. 62/502,346 filed on 5 May 2017, entitled SMART MATCHING WITH ARTIFICIAL INTELLIGENCE FOR REAL ESTATE USAGE IN TRANSACTIONS, PROMOTIONS, BUY, SELL, RENT & OTHER RELATED APPLICATIONS. The entire contents of the foregoing application are hereby incorporated by reference for all purposes.

BACKGROUND

The following relates generally to facilitating real estate transactions, and more specifically to matching users and properties and using artificial intelligence.

In the real estate industry, a significant amount of time is spent matching buyers, sellers, renters, properties, agents, and related services/service providers. For example, real estate agents and potential buyers may spend excessive time trying to find appropriate properties, while buyers and sellers may spend excessive time finding suitable agents. Additionally, buyers and sellers may have to use multiple different services to find properties and execute transactions. This results in loss of time for agents, buyers, sellers and renters.

Furthermore, buyers and sellers may have needs such as interior design, loan services, legal needs, or various other information-intensive services. Finding the appropriate providers of these services separately may be complicated and time consuming for individual users.

SUMMARY

The present disclosure describes methods for efficiently meeting the needs of property buyers, sellers, agents, renters and service providers. Specifically, an artificial intelligence application system makes matching recommendations to users and provides a platform where buyers can be directly matched to the most relevant properties or owners (sellers). Attributes of the user and of each property are combined and processed by a machine learning model. The output of the model represents a prediction that a user will click on, or otherwise select, the property. The properties are then ranked and displayed to the user. When a user interacts with a property, the interaction is then used to update the model. In some cases, the system provides recommendations for additional products and services. This may include recommendations for interior design, loan services, legal needs, and various other information services based on user needs. In some cases, a natural language processing system identifies property and user attributes based on a natural language query. In some cases, a chatbot may respond to natural language queries in real time to facilitate the matching and recommendation services.

A method for matching users and properties using artificial intelligence is described. The method may include identifying a profile of a user, the profile including a plurality of user characteristics, identifying a plurality of real estate properties, where each of the plurality of real estate properties includes a plurality of property characteristics, generating an input vector for each of the plurality of real estate properties, where each input vector includes the plurality of property characteristics for the corresponding real estate property and the plurality of user characteristics, and generating a rating factor for each of the real estate properties based on the input vector and a machine learning algorithm, where the rating factor includes a probability of a user interaction with the corresponding real estate property.

An apparatus for matching users and properties using artificial intelligence is described. The apparatus may include a processor, memory in electronic communication with the processor, and instructions stored in the memory. The instructions may be operable to cause the processor to identify a profile of a user, the profile including a plurality of user characteristics, identify a plurality of real estate properties, where each of the plurality of real estate properties includes a plurality of property characteristics, generate an input vector for each of the plurality of real estate properties, where each input vector includes the plurality of property characteristics for the corresponding real estate property and the plurality of user characteristics, and generate a rating factor for each of the real estate properties based on the input vector and a machine learning algorithm, where the rating factor includes a probability of a user interaction with the corresponding real estate property.

A non-transitory computer readable medium storing code for matching users and properties using artificial intelligence is described. In some examples, the code includes instructions executable by a processor to: identify a profile of a user, the profile including a plurality of user characteristics, identify a plurality of real estate properties, where each of the plurality of real estate properties includes a plurality of property characteristics, generate an input vector for each of the plurality of real estate properties, where each input vector includes the plurality of property characteristics for the corresponding real estate property and the plurality of user characteristics, and generate a rating factor for each of the real estate properties based on the input vector and a machine learning algorithm, where the rating factor includes a probability of a user interaction with the corresponding real estate property.

An apparatus for matching users and properties using artificial intelligence is described. The apparatus may include means for identifying a profile of a user, the profile including a plurality of user characteristics, means for identifying a plurality of real estate properties, where each of the plurality of real estate properties includes a plurality of property characteristics, means for generating an input vector for each of the plurality of real estate properties, where each input vector includes the plurality of property characteristics for the corresponding real estate property and the plurality of user characteristics, and means for generating a rating factor for each of the real estate properties based on the input vector and a machine learning algorithm, where the rating factor includes a probability of a user interaction with the corresponding real estate property.

Some examples of the method, apparatus, and non-transitory computer-readable medium described above may further include ranking the plurality of real estate properties based at least in part on the corresponding rating factors. Some examples of the method, apparatus, and non-transitory computer-readable medium described above may further include displaying the plurality of real estate properties to the user based at least in part on the ranking.

Some examples of the method, apparatus, and non-transitory computer-readable medium described above may further include identifying a user interaction with at least one of the plurality of real estate properties. Some examples of the method, apparatus, and non-transitory computer-readable medium described above may further include updating the machine learning algorithm based at least in part on the user interaction.

Some examples of the method, apparatus, and non-transitory computer-readable medium described above may further include generating a plurality of component rating factors for each of the real estate properties, where each of the component rating factors is based on the input vector and a component machine learning algorithm. Some examples of the method, apparatus, and non-transitory computer-readable medium described above may further include combining the plurality of component rating factors using an ensembling algorithm, where the rating factor for each of the real estate properties is based at least in part on the combination.

Some examples of the method, apparatus, and non-transitory computer-readable medium described above may further include generating the rating factor for each of the real estate properties includes multiplying the input vector by a weighting matrix of the machine learning algorithm.

In some examples of the method, apparatus, and non-transitory computer-readable medium described above, the plurality of user characteristics include an age, a location, a family size, a family composition, a set of family ages, an income, a loan eligibility, a work indicator, a living environment preference, a home ownership indicator, a residence history, a browsing history, a time spent viewing other properties, a time spent using a real estate search platform, a number of times other properties have been visited, a set of user boot marked/approved properties, or any combination thereof.

Some examples of the method, apparatus, and non-transitory computer-readable medium described above may further include identifying a time series of user interactions. Some examples of the method, apparatus, and non-transitory computer-readable medium described above may further include generating a predictive user characteristic based at least in part on the time series of user interactions and a recurrent neural network (RNN), where the plurality of user characteristics includes the predictive user characteristic.

In some examples of the method, apparatus, and non-transitory computer-readable medium described above, the rating factor for each of the plurality of real estate properties includes a similarity rating corresponding to the set of user approved real estate properties.

In some examples of the method, apparatus, and non-transitory computer-readable medium described above, the plurality of property characteristics for each of the real estate properties includes a price, a location, a number of bedrooms, a number of bathrooms, a house style & structure, a house size, a distance from key locations, a school rating, a crime rate, a natural disaster factor, a valuation fluctuation parameter, a surrounding environment or vicinity, or any combination thereof. In some examples of the method, apparatus, and non-transitory computer-readable medium described above, the plurality of property characteristics for each of the real estate properties includes one or more deep learning factors derived from pictures or visual descriptions.

Some examples of the method, apparatus, and non-transitory computer-readable medium described above may further include receiving a user query including a natural language property description. Some examples of the method, apparatus, and non-transitory computer-readable medium described above may further include identifying a plurality of property descriptors based on the natural language property description, where the plurality of real estate properties are identified based at least in part on the plurality descriptors. Some examples of the method, apparatus, and non-transitory computer-readable medium described above may further include identifying one or more real estate market trend indicators, where the rating factor for each of the plurality of real estate properties is based at least in part on the one or more market trend indicators.

Some examples of the method, apparatus, and non-transitory computer-readable medium described above may further include identifying one or more similar user pattern indicators and one or more similar needs pattern indicators, wherein the rating factor for each of the plurality of real estate properties is based at least in part on the one or more similar user pattern indicators and the one or more similar needs pattern indicators. Some examples of the method, apparatus, and non-transitory computer-readable medium described above may further include identifying one or more matching users for the user based at least in part on the user profile, and displaying the one or more matching users to the user. The matching users can represent an owner that is matched to a user that is buying or renting property, a potential buyer/renter matched to a user that owns property, or another user with similar needs to the current user.

Some examples of the method, apparatus, and non-transitory computer-readable medium described above may further include identifying a property filter. Some examples of the method, apparatus, and non-transitory computer-readable medium described above may further include selecting the plurality of real estate properties based at least in part on the property filter.

Some examples of the method, apparatus, and non-transitory computer-readable medium described above may further include identifying one or more additional products or service providers based at least in part on the user profile. Some examples of the method, apparatus, and non-transitory computer-readable medium described above may further include displaying the one or more additional products or services to the user.

In some examples of the method, apparatus, and non-transitory computer-readable medium described above, the one or more additional products or services includes a real estate agent service provider, a household goods product, a moving service provider, a renovation contractor, a property inspector, a mortgage provider, a neighborhood service or goods provider, or any combination thereof.

In some examples of the method, apparatus, and non-transitory computer-readable medium described above, the user interaction includes clicking on a display element, buying a property, selecting a property, commenting on a property, commenting on a post, bookmarking a property or page, or any combination thereof.

DETAILED DESCRIPTION

Figure 1:
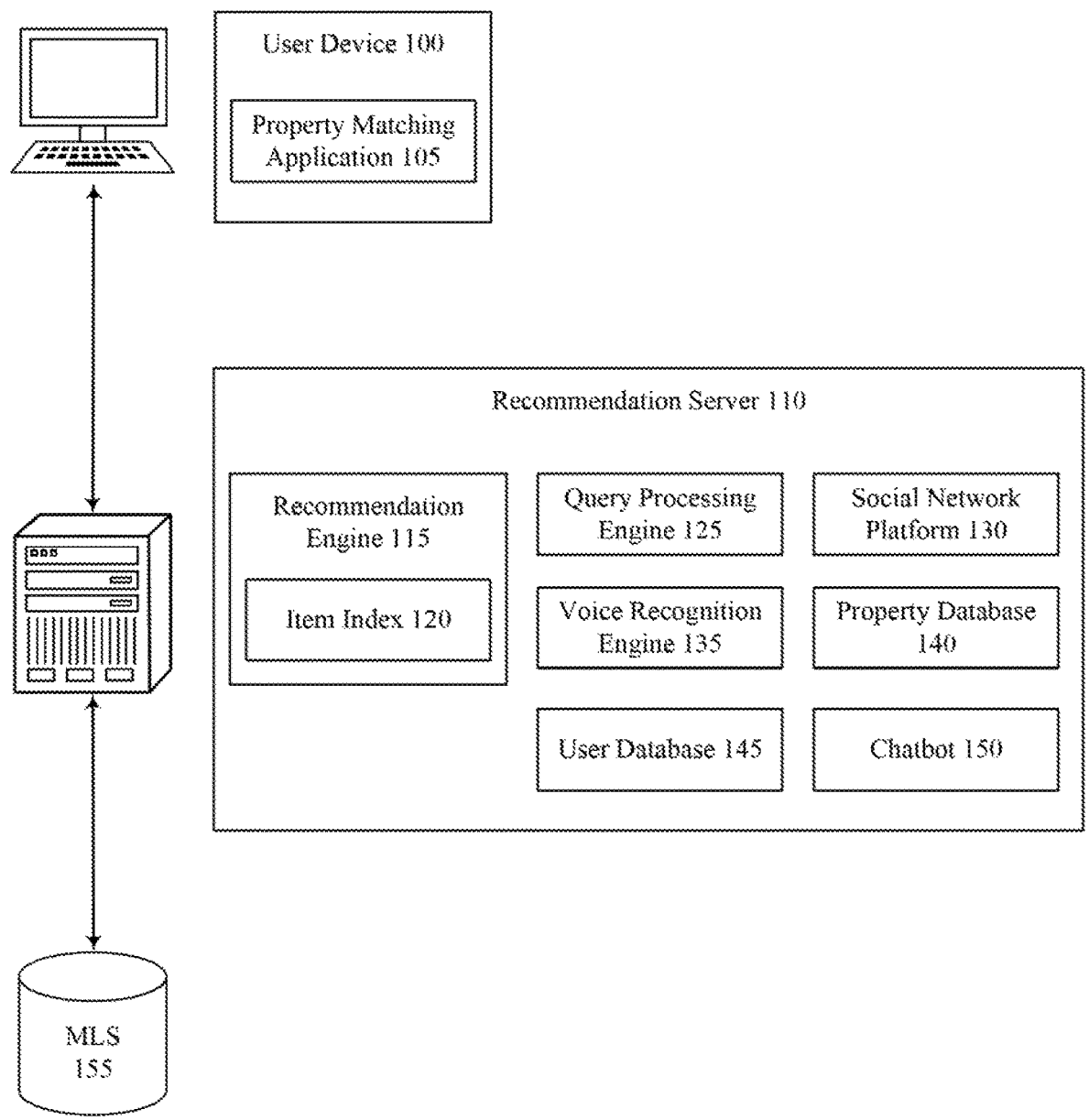
FIG. 1 shows an example of a recommendation system in accordance with aspects of the present disclosure.

In the real estate industry, systems for finding and buying properties are extremely inefficient. For example, buyers spend lots of time searching for houses on real estate websites. However, they may be limited in the amount of time they can spend, as well as in their knowledge of the market. Furthermore, the systems behind real estate websites and other applications are often limited in their memory and computational power, rendering them unable to provide results that take into account large amounts of data (e.g., the characteristics of millions of properties) to meet buyer needs, let alone provide property information that specifically cater to the user's needs. Thus, much of the time people spend searching for real estate is unproductive.

Other aspects of real estate transactions are also inefficient. For example, in order to initiate a transaction, a buyer may have to first contact an agent to find a house according to the buyer's interest and price range. The agent may have limited time to offer the user in finding a best fit house, or to do an analysis regarding whether the house is a good fit. The agent may also be limited in time when serving multiple clients, answering communications, and executing other administrative duties. Thus, the advice they give may be incomplete or misleading.

In some cases, buyers may have difficulty trying to find and communicate with traditional agents at all. For example an agent may not have time to reply to all of the queries received from clients. The agent may further be limited in their time to do research to answer their client, and they may be limited in their ability to find trends from available data. Furthermore, agents may be disadvantaged if they try to answer all their clients' questions. They may find that going to meetings or doing house visits is more profitable. That is, simple questions such as pricing queries may detract from the agent's time. However, many of these queries could be answered by an automated system as described in the present disclosure.

To address these needs, a recommendation system with "smart matching" capability is described. Smart matching may refer to the ability of the system to logically match a user with their specific historical or predictive needs based on history and data provided by the user. The smart matching may include: smart matching of real estate property to suitable buyers, smart matching of agents to buyers/sellers, smart matching of buyers to sellers, smart matching of potential buyers to potential property for sale without traditional listing, and other smart services for real estate needs including smart matching for loan, interior design or renovations, or others. Additionally, an automated real time communication service (e.g., a chatbot) may be used to answer questions for the user in real time.

According to this present disclosure, a user may access a property matching application using a computing device that communicates with an application server. The computing device may be a personal computer, laptop computer, mainframe computer, palmtop computer, personal assistant, mobile device, or any other suitable processing apparatus.

A processor on the computing device (or on the server) may include an intelligent hardware device, (e.g., a general-purpose processing component), a digital signal processor (DSP), a central processing unit (CPU), a microcontroller, an application specific integrated circuit (ASIC), an field programmable gate array (FPGA), a programmable logic device, a discrete gate or transistor logic component, a discrete hardware component, or any combination thereof. In some cases, the processor may be configured to operate a memory array using a memory controller. In other cases, a memory controller may be integrated into processor. The processor may be configured to execute computer-readable instructions stored in a memory to perform various functions. In some examples, a processor may include special purpose components for modem processing, baseband processing, digital signal processing, or transmission processing. In some examples, the processor may include a system-on-a-chip.

A server may provide one or more functions to requesting users linked to the server by way of one or more networks such as a local area network (LAN), wide area network (WAN), Internet, etc. In some cases, the server may include a single microprocessor board, which may include a microprocessor responsible for controlling all aspects of the server. In some cases, a server may use microprocessor and protocols to exchange data with other devices/users on one or more of the networks via hypertext transfer protocol (HTTP), and Simple Mail Transfer Protocol (SMTP), although other protocols such as file transfer protocol (FTP), and Simple Network Management Protocol (SNMP). In some cases, a server may be configured to send and receive Hyper Text Markup Language (HTML) formatted files along with associated scripts (e.g., for displaying web pages). A server may be a general purpose computing device, a personal computer, a laptop computer, a mainframe computer, a super computer, or any other suitable processing apparatus.

FIG. 1 shows an example of a recommendation system in accordance with aspects of the present disclosure. The example shown includes user device 100, recommendation server 110, chatbot 150, and multiple listing service (MLS) 155.

A recommendation system illustrated here may efficiently find properties for buyers and agents according to their various needs and preferences, using both historical data (i.e., directly observed) and projected or predictive data. For example, suitable properties may be recommended based on the user's profile, browsing history, and their specified needs. If the user is an agent, the recommendation system may also recommend buyers/sellers to the agent, based on the buyer or seller's profile. The recommendation system may also use smart matching. or social networking capabilities to promote or recommend potential properties before they are listed in market, based on the potential buyer's profile and/or social network information and the property itself.

In addition to locating the most appropriate properties for a buyer or renter, the recommendation system can also locate potential owners/sellers, even if a property is not listed in the active database of the recommendation system. For example, the properties may be for sale by owner or listed in other databases where the owner/seller can be traced, or the system may locate a property with potential seller (i.e., not yet listed for sale). Thus, in addition to being matched with properties, users may be directly matched with other users. This feature may apply to both buying and renting of property. That is, the recommendation system may locate appropriate properties for a renter, and, if owner/landlord information is available separately, the system may also connect the renter directly to a landlord.

The recommendation system identifies user properties (including data explicitly input by the user, patterns in browsing history, and other user data). For example, the system may differentiate users based on whether they are seeking a primary residence or an investment property. If a user is seeking an investment property, the recommendation system may give more weight to properties that have a higher projected value in 5 years. The recommendation system accounts for a multitude of factors when searching for a property, while additionally having access to enough computational power to process millions of data points.

The recommendation system may also utilize the pattern of properties that other similar users have chosen to match properties to the user. The recommendation system identify one or more similar user pattern indicators and one or more similar needs pattern indicators, and the rating factor for each of the of real estate properties is based at least in part on the one or more similar user pattern indicators and the one or more similar needs pattern indicators. The recommendation system may also identify one or more matching users for the user based at least in part on the user profile, and display the one or more matching users to the user. The matching users can represent an owner that is matched to a user that is buying or renting property, a potential buyer/renter matched to a user that owns property, or another user with similar needs to the current user.

The system may also identify market trends or circumstances and provide appropriate properties accordingly. The recommendation system accounts for a multitude of factors when searching for a property, while additionally having access to enough computational power to process millions of data points.

The recommendation system may monitor user activity and use the data to improve itself over time. For example, the recommendation system may determine whether a property A is preferable to a property B. if the user chooses to view property B, their interest may he collected as a data point and added to a set of training data. The previous model may be loaded from a saved state and updated according to the augmented training data. In some examples, a threshold amount of data is collected prior to generating the model.

Some embodiments of the recommendation system may be optimized by predicting and measuring how a user will rate a property. For example, one set of inputs may be user features such as browsing history, as well as property features such as size and location. The output may be a prediction regarding a rating the user would give the property, or a likelihood that the user will select the property for further consideration. Thus, the goal of the recommendation system is to accurately predict the rating or probability of interaction for any set of user and property inputs. Over time, the recommendation system may obtain an accurate mapping of inputs to ratings/probabilities.

For example, the recommendation model may logically determine a value for this probability as a function of user i and property j. The inputs for this function may include: user features (i.e., age, family size, income, and browsing history), property features (i.e., price, location, size, and neighborhood information), and other data about user interaction, such as how often the user i has visited certain other properties. The user features may include both historical user data (i.e., data directly collected from the user) and predictive data.

In order to determine projected user ratings as a function of inputs, the recommendation system may use a factorization algorithm. This algorithm may use multiple metrics to arrive at the final rating value for user, including accuracy, similarity, diversity, and awareness.

For example, a content-based recommendation model may use information about the user and the content to recommend items based on "similarity". "Similarity" between the user and the items may be computed from item attributes. For example, if the items are properties with basements, similarity may be measured by characteristics such as type of basement, condition of basement, square footage of the basement, separate entrance availability, etc.

In some embodiments, the recommendation system may recommend the same items to similar users. This is based on the probability that two users with similar preferences are likely to end up buying similar houses. By determining that another user is similar to the current user, an accurate prediction can be made on the current user's interests by simply recommending the same item, or by giving additional weight to items selected by the similar user.

The recommendation system may also provide users with recommendations for products or services related to a real estate transaction, such as the smart matching of interior design, renovation, loan services, and legal needs. This smart matching may be based on the user's standard features, such as age, income, and location; the smart matching may additionally be based on dynamic features such as browsing history, preferences, and other measures of user activity. The user features may include both historical user data and predictive data.

In some examples, the recommendation system may gather data from real estate listing services such as MLS 155, such as a first multiple listing service (FMLS) regional MLS, or another property database. In some cases such listing systems are not available, which may result in difficulty finding appropriate properties and leads for buyers, sellers, and agents. Embodiments of the described invention may process user profile information, listed property information, unlisted or potentially for-sale property information, and agent information together efficiently to provide recommendations to meet user needs regardless of the availability of an MLS.

In some embodiments, the recommendation system may utilize multiple machine learning models, depending on the needs of each user. In a buyer recommendation model, suitable properties for a particular buyer may be recommended to meet an objective identified by or projected on behalf of the buyer. In an agent recommendation model, suitable properties for an agent to work on and suitable leads of new buyers and sellers may be recommended to meet the agent's needs or objectives. The results from each model may be presented as a recommendation list to the user, and maybe with some ranking or rating in the list.

As described above, the recommendation process may be a function of both a user and a property. Data associated with users and properties may be referred to as "features". The user may have features such as profile information, browsing history, location, age, etc. The property may have features such as number of bedrooms, square footage, location, vicinity, property structure, style, etc. The user features and property features may be used in different ways to produce a response.

In some cases, each user may be associated with standard features, such as age, location, family information, income, ownership of properties, and others. Users may also be associated with dynamic features that impact the recommendation system model, such as browsing history, time spent on each property, number of times properties have been visited, and others.

Each property may also be associated with standard features such as price, location, type of property, size, distance from places of interest, crime rates, and others. Properties may also be associated with dynamically determined features such as visual features from imaging of the property, and latent features derived from description of the property, or property history.

User device 100 may include property matching application 105, which may allow a user (e.g., a person searching for a property to buy or rent) to interact with the recommendation system. In some cases, the user may log in to the property matching application 105 either automatically, or by providing identifying information, prior to viewing their smart recommendations. The property matching application 105 may display the plurality of real estate properties to the user based at least in part on a ranking of properties. It may also display the one or more additional products or services to the user.

In some cases, a 'fit' score may be displayed to the user along with each property. The 'fit' score may be based on the output of the machine learning algorithm (i.e., the rating assigned to each property), and may represent how closely a property matches the needs or preferences of a user according to the recommendation system. Thus, some users may consider the 'fit' score when deciding which properties are worthy of further investigation.

Recommendation server 110 may generate the machine learning model and perform the matching and recommendation functions of the system. Recommendation server 110 may be an example of, or include aspects of, the corresponding element described with reference to FIG. 2. Recommendation server 110 may include recommendation engine 115, query processing engine 125, social network platform 130, voice recognition engine 135, property database 140, and user database 145. In some cases, the recommendation engine 115 may identify a time series of user interactions in order to identify user characteristics and preferences, or to process user queries. The recommendation engine 115 may generate a predictive user characteristic or interaction based at least in part on the time series of user interactions and a recurrent neural network (RNN) model. The recommendation engine 115 may also identify one or more real estate market trend indicators, where the rating factor for each of the plurality of real estate properties is based at least in part on the one or more market trend indicators. The recommendation engine 115 may also identify one or more additional products or service providers based at least in part on the user profile.

An RNN may account for a time series of interaction using a hidden layer of neural nodes. In a feed-forward neural network, a hidden layer neuron may refer to a node whose output is connected to the inputs of other nodes, but is not visible as a network output. A hidden layer neuron may be described as presynaptic, because it is connected to other neurons which are post-synaptic in relation to its output. Neurons may form layers, which may be connected to and from both post and pre-synaptic neurons. Groups of neurons that are connected to other neurons may be referred to as hidden layers or hidden layer neurons.

In some examples, the recommendation engine 115 may recommend additional products or services such as a real estate agent service provider, a household goods product, a moving service provider, a renovation contractor, a property inspector, a mortgage provider, a neighborhood service or goods provider, or any combination thereof. In some examples, the user interaction includes clicking on a display element, buying a property, selecting a property, commenting on a property, commenting on a post, or any combination thereof.

Recommendation engine 115 may be an example of, or include aspects of, the corresponding element described with reference to FIG. 2. In some cases, recommendation engine 115 may include an item index 120. The index may be used to store rating factors and other information so that responses to server queries may be provided with reduced latency. For example, a set of rating factors may be generated at a certain periodicity, or when additional data is received about a user or property. This data can then be served to a user upon demand.

The query processing engine 125 may receive a user query including a natural language property description. The query may be related to a property search or to a real time communication with a chatbot. The query processing engine 125 may also identify a plurality of property descriptors based on the natural language progeny description, where the plurality of real estate properties are identified based at least in part on the plurality descriptors.

Many real estate applications have little or no support for social networking. However, social networking may be critical for allowing users to keep up to date with the real estate market and meet their various needs. Thus, according to the present disclosure, smart social network platform 130 can help collect and curate information on real estate from a social platform perspective, and enable better service. It may be an example of, or include aspects of, the corresponding element described with reference to FIG. 2. The smart social network may provide more relevant information to users in an easily accessible place. The smart social network may also monitor and store data about user activity in order to better provide recommendations. The social platform may allow buyers and (or) sellers to interface with each other efficiently by "smart matching" them to each other and providing direct messaging services. The smart social network may also curate relevant advertisements to users, which may benefit both users and advertisers, and generate revenue. A social network platform 130 may contain a module for the user network, in which users can log in and conduct networking. The social network platform 130 may also provide subject matter forums, as well as review forums and message board to exchange communications or engage transactions.

The recommendation system may include databases for both property and user data. In some example, property database 140 may contain property data obtained from MLS 155, as well as for sale by owner property data, and unlisted, potential for-sale property data from users. A user database 145 may contain information about users, and their buying, selling, renting, or other activity. The user database 145 may also contain information collected from various sources, such as social networking services. The recommendation system may process user needs to provide smart matching recommendations.

Thus, property database 140 may store information about properties that can be used as input for the recommendation system. It may be an example of, or include aspects of, the corresponding element described with reference to FIG. 2. User database 145 may store information about users that can be used as input for the recommendation system. It may be an example of, or include aspects of, the corresponding element described with reference to FIG. 2.

The chatbot 150 (or artificial intelligence (AI) communicator) can quickly and efficiently provide users with answers to real estate questions. The chatbot 150 can understand questions from buyers with submitted queries using natural language processing. The AI communicator can reply to the queries on behalf of the agent at any time of the day, without needing constant attention from the agent. The AI communicator may also answer the questions instantly, instead of waiting for an agent to reply. The AI communicator can also process millions of data points that an agent may not have time to analyze. Chabot 150 may be an example of, or include aspects of, the corresponding element described with reference to FIG. 5. In some examples of the recommendation system, a voice recognition platform may contain text to speech and voice to text engines to provide a voice interface to users.

In some examples of the recommendation system, a CRM component may handle customer relations tasks for an agent to save the agent time. For example, an agent may have difficulty finding customers and maintaining customer relations. In some cases, an agent may have to find customers over word of mouth recommendations or reach out to potential customers over mails. Furthermore, the agent may spend time in correspondence to the client that may be better spent for other purposes. The smart agent CRM may find properties for the agent, which the agent may then recommend to the client. The smart agent CRM may also reply on behalf of the agent at any time of day. Additionally, the smart agent CRM may analyze and organize customers into pipelines so their needs can be handled more efficiently. The smart agent CRM may also create and manage market campaigns to help the agent have better market reach, and process the sales pipeline management for agent all the way to closing.

Thus, the recommendation system may include capabilities for buyer/seller to agent matching, buyer to seller matching, and buyer to property matching, as well as renter to property matching. It may utilize a buyer/seller/agent/renter query analyzer followed by buyer/seller/agent/renter collaborative filtering, which may be graph based, utilize singular value decomposition, and a restricted Boltzmann machine to learn a probability distribution over the set of inputs. The system may also utilize a property keyword analyzer and feature extraction based on content filtering to detect property similarity.

Figure 2:
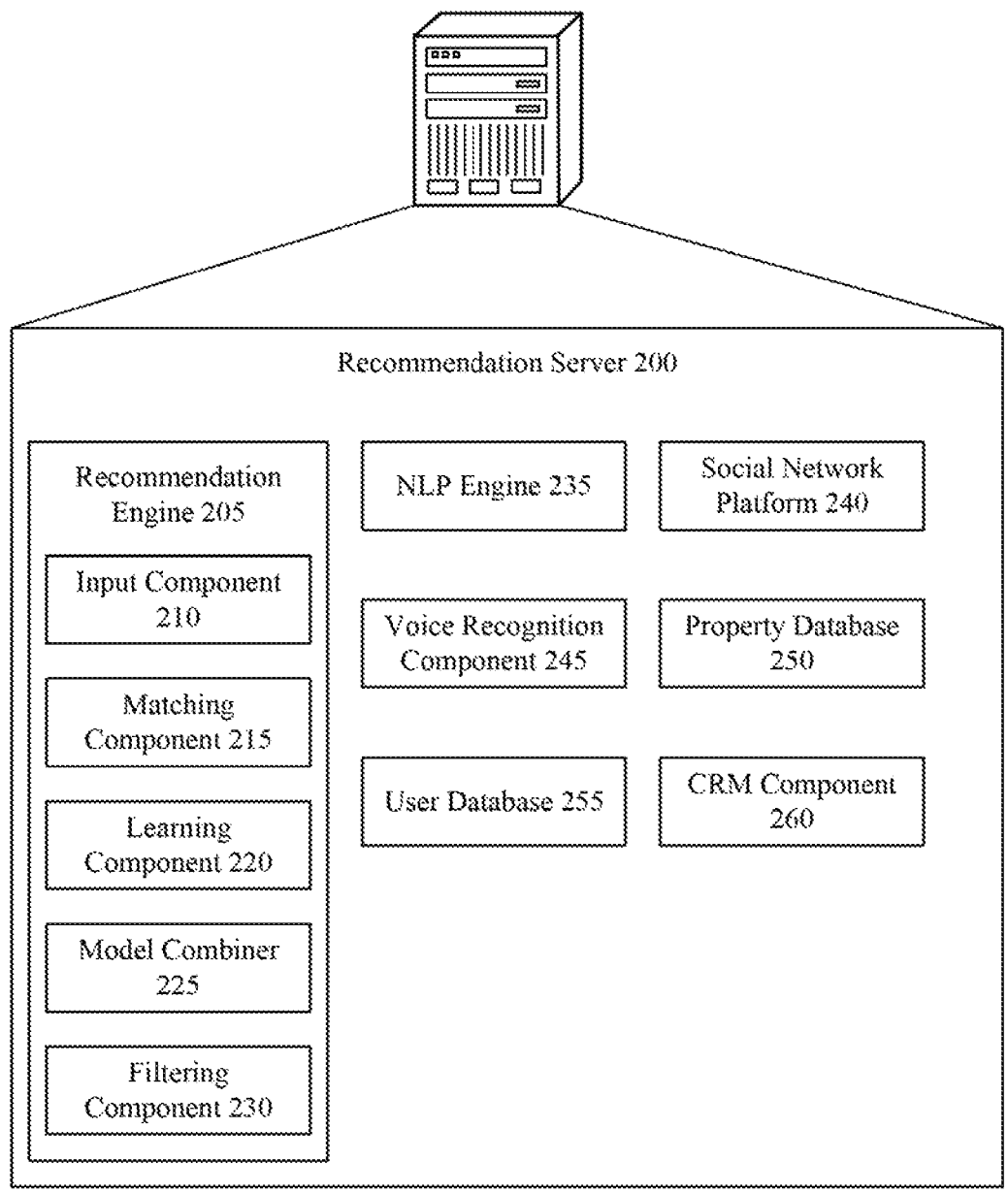
FIG. 2 shows an example of a recommendation server in accordance with aspects of the present disclosure.

FIG. 2 shows an example of a recommendation server 200 in accordance with aspects of the present disclosure. The example shown includes recommendation server 200. Recommendation server 200 may be an example of, or include aspects of, the corresponding element described with reference to FIG. 1. Recommendation server 200 may include recommendation engine 205, NLP engine 235, social network platform 240, voice recognition component 245, property database 250, user database 255, and CRM component 260.

Recommendation engine 205 may be an example of, or include aspects of, the corresponding element described with reference to FIG. 1. Recommendation engine 205 may include input component 210, matching component 215, learning component 220, model combiner 225, and filtering component 230.

The input component 210 may identify a profile of a user, the profile including a plurality of user characteristics. The input component 210 may also identify a plurality of real estate properties, where each of the plurality of real estate properties includes a plurality of property characteristics. The input component 210 may also generate an input vector for each of the plurality of real estate properties, where each input vector includes the plurality of property characteristics for the corresponding real estate property and the plurality of user characteristics. Input component 210 may be an example of, or include aspects of, the corresponding element described with reference to FIG. 5.

In some examples, the plurality of user characteristics include an age, a location, a family size, a family composition, a set of family ages, an income, a loan eligibility, a work indicator, a home ownership indicator, a residence history, a browsing history, a time spent viewing other properties, a time spent using a real estate search platform, a number of times other properties have been visited, a set of user approved properties, or any combination thereof. In some examples, the plurality of property characteristics for each of the real estate properties includes a price, a location, a number of bedrooms, a number of bathrooms, a house style and structure, a house size, a distance from key locations, a school rating, a crime rate, a natural disaster factor, a valuation fluctuation parameter, a surrounding environment and vicinity, or any combination thereof. In some examples, the plurality of property characteristics for each of the real estate properties includes one or more deep learning factors derived from pictures or visual descriptions. The user and property characteristics may include both historical data (i.e., data collected or observed directly) and predictive data.

The matching component 215 may generate a rating factor for each of the real estate properties based on the input vector and a machine learning algorithm, where the rating factor includes a probability of a user interaction with the corresponding real estate property. The matching component 215 may also rank the plurality of real estate properties based at least in part on the corresponding rating factors. The matching component 215 may also generate a plurality of component rating factors for each of the real estate properties, where each of the component rating factors is based on the input vector and a component machine learning algorithm. The matching component 215 may also generate the rating factor for each of the real estate properties includes multiplying the input vector by a weighting matrix of the machine learning algorithm. In some examples, the rating factor for each of the plurality of real estate properties includes a similarity rating corresponding to the set of user approved real estate properties.

The learning component 220 may identify a user interaction with at least one of the plurality of real estate properties. The learning component 220 may also update the machine learning algorithm based at least in part on the user interaction.

The model combiner 225 may combine the plurality of component rating factors using an ensembling algorithm, where the rating factor for each of the real estate properties is based at least in part on the combination. For example, models that may be combined include Gradient Boosting Tree, Reverse Boltzman Machine, Multi Layer perceptron, Adaboost, Random Forest, Logistic Regression, K Nearest Neighbor models, or any combination thereof.

The filtering component 230 may identify a property filter and select the plurality of real estate properties based at least in part on the property filter. That is, in some cases only a recommendation or rating is provided for only a subset of a property database according to one or more applied filters.

Social network platform 240 may be an example of, or include aspects of, the corresponding element described with reference to FIG. 1. Property database 250 may be an example of, or include aspects of, the corresponding element described with reference to FIG. 1. User database 255 may be an example of, or include aspects of, the corresponding element described with reference to FIG. 1.

NLP engine 235 may receive a user query from text or voice input, and send the query to the recommendation system to provide a result. For example, NLP engine 235 may be used to process user property searches or to facilitate communication with a chatbot.

Figure 3:
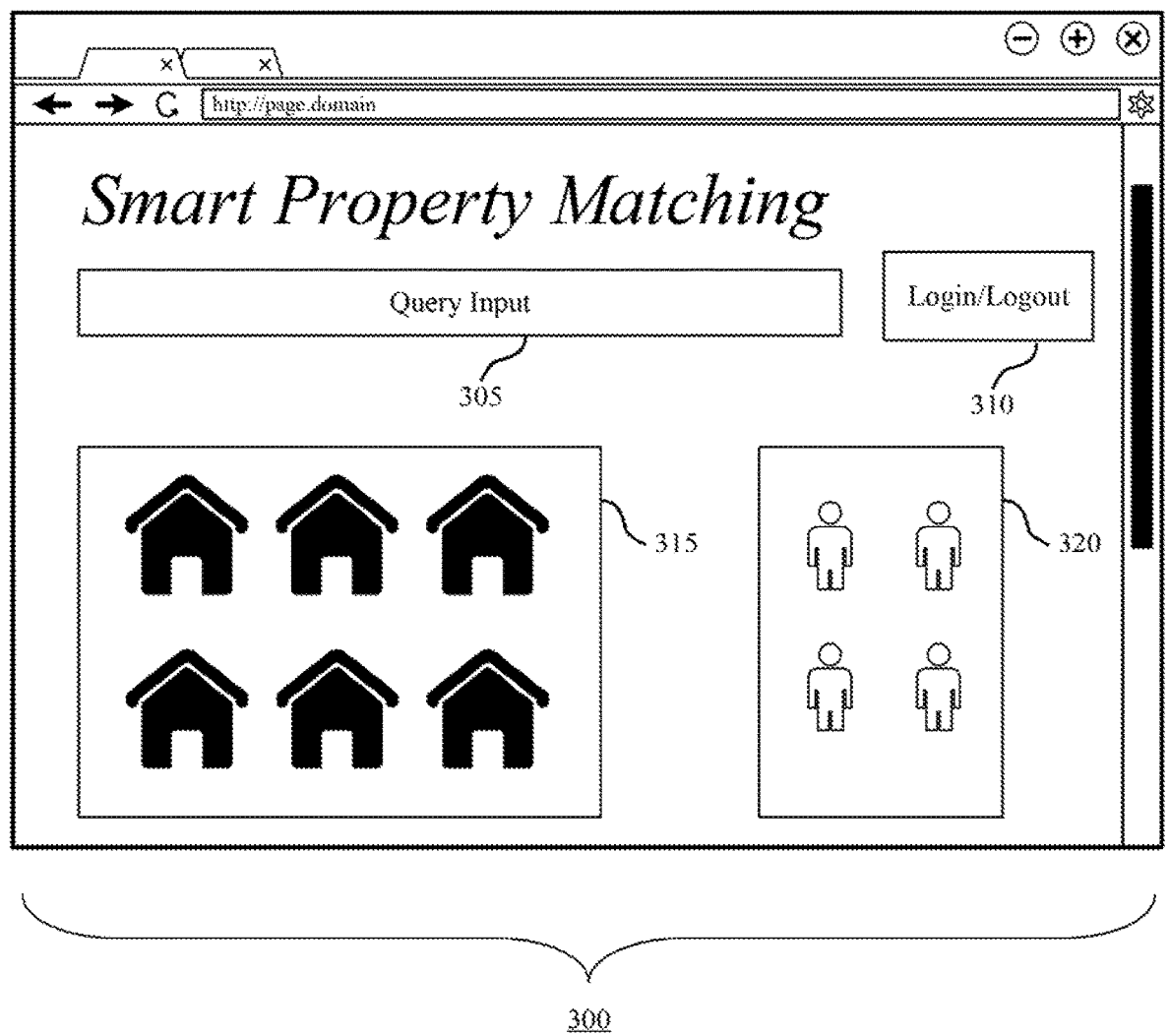
FIG. 3 shows an example of a user application screenshot in accordance with aspects of the present disclosure.

FIG. 3 shows an example of a user application screenshot in accordance with aspects of the present disclosure. The example shown includes browser window 300, which may be an example of or interact with a property matching application on a user device as described with reference to FIG. 1. Browser window 300 may include query input 305, login button 310, property recommendations 315, and service recommendations 320.

Figure 4:
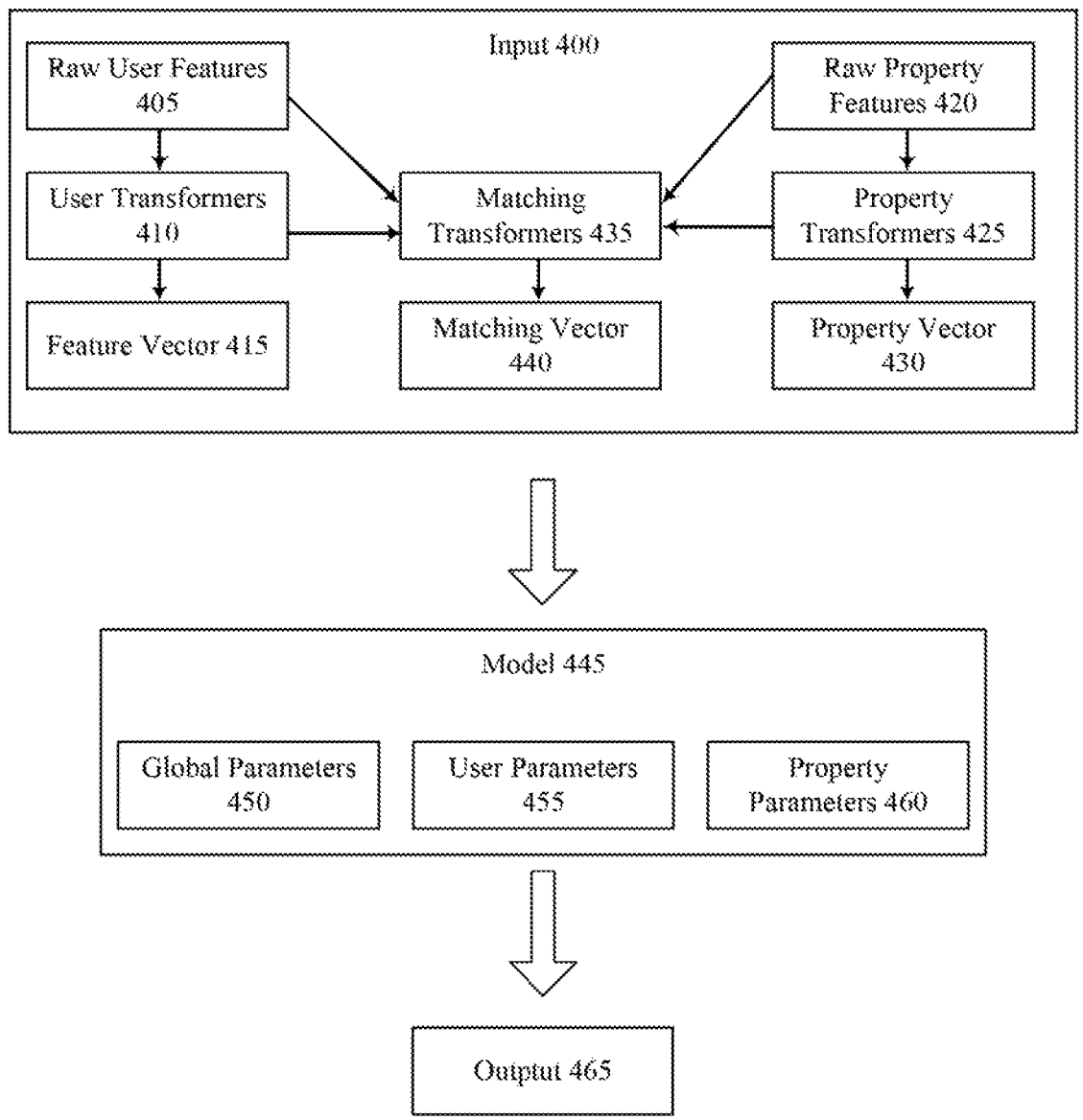
FIG. 4 shows an example of a machine learning model in accordance with aspects of the present disclosure.

FIG. 4 shows an example of a machine learning model 445 in accordance with aspects of the present disclosure. The example shown includes input 400, model 445, and output 465.

Input 400 may include raw user features 405, user transformers 410, feature vector 415, raw property features 420, property transformers 425, property vector 430, matching transformers 435, and matching vector 440. Model 445 may include global parameters 450, user parameters 455, and property parameters 460. For example, each model may be represented by the equation such as:

$$p(i,j) = f(x_i, z_j, m_{ij} | \theta, \alpha_i, \beta_j),$$

where $x_i$ represents the feature vector 415, $z_j$ represents property vector 430, $m_{ij}$ represents matching vector 440, $\theta$ represents global parameters 450, $\alpha_i$ represents user parameters 455, and $\beta_j$ represents property parameters 460. The output of each model may be combined to generate a final rating.

Some embodiments of the recommendation system may utilize a combination of multiple models 445 known as an "ensemble model" which may be combined by a model combiner as described with reference to FIG. 3. For example, the ensemble model may include components from models such as a Gradient Boosting Tree, Reverse Boltzman Machine, Multi Layer perceptron, Adaboost, Random Forest, Logistic Regression, K Nearest Neighbor models, or any combination thereof. The models 445 used in the system may be parametric models 445, i.e., models whose results depend on a set of parameters. Thus, if the parameters change, the model 445 changes with them. In some cases, different sets of parameters may be stored in a parameter server.

Figure 5:
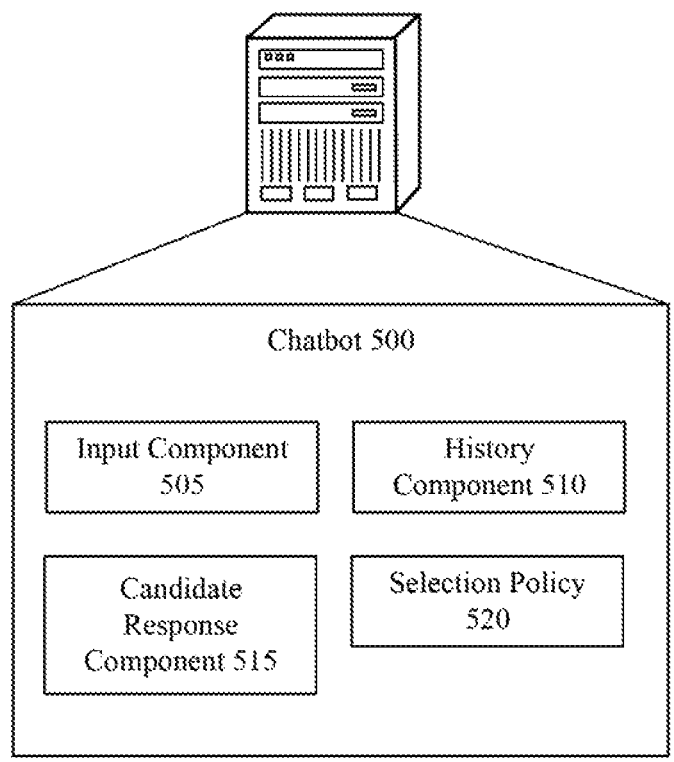
FIG. 5 shows an example of a chatbot system in accordance with aspects of the present disclosure.

FIG. 5 shows an example of a chatbot system in accordance with aspects of the present disclosure. The example shown includes chatbot 500. In some examples, the recommendation system may contain natural language understanding and processing capabilities. A chatbot system may guide users to find different properties or related real estate needs as a virtual assistant. The recommendation system may receive user requests and run them through the appropriate modules and databases to provide smart matching and other recommendations to users. There may be multiple interfaces of the recommendation system provided to the user, such as a web or mobile interface. These interfaces may offer similar or differing functionality to the user, depending on their needs. User data is continuously fed into the recommendation system such that the system is dynamic, that is, constantly updating and improving itself.

Chatbot 500 may be an example of or include aspects of, the corresponding element described with reference to FIG. 1. Chatbot 500 may include input component 505, history component 510, candidate response component 515, and selection policy 520. Input component 505 may be an example of, or include aspects of, the corresponding element described with reference to FIG. 2.

In some examples, chatbot 500 may generate one or more response models, and then generate multiple candidate responses. The candidate responses may be based on a dialogue history and may be associated with a confidence level. If there is a priority response, the priority response may be returned to the user. If not, a response selection policy 520 may be used to evaluate the candidate responses and return a selected response.

Figure 6:
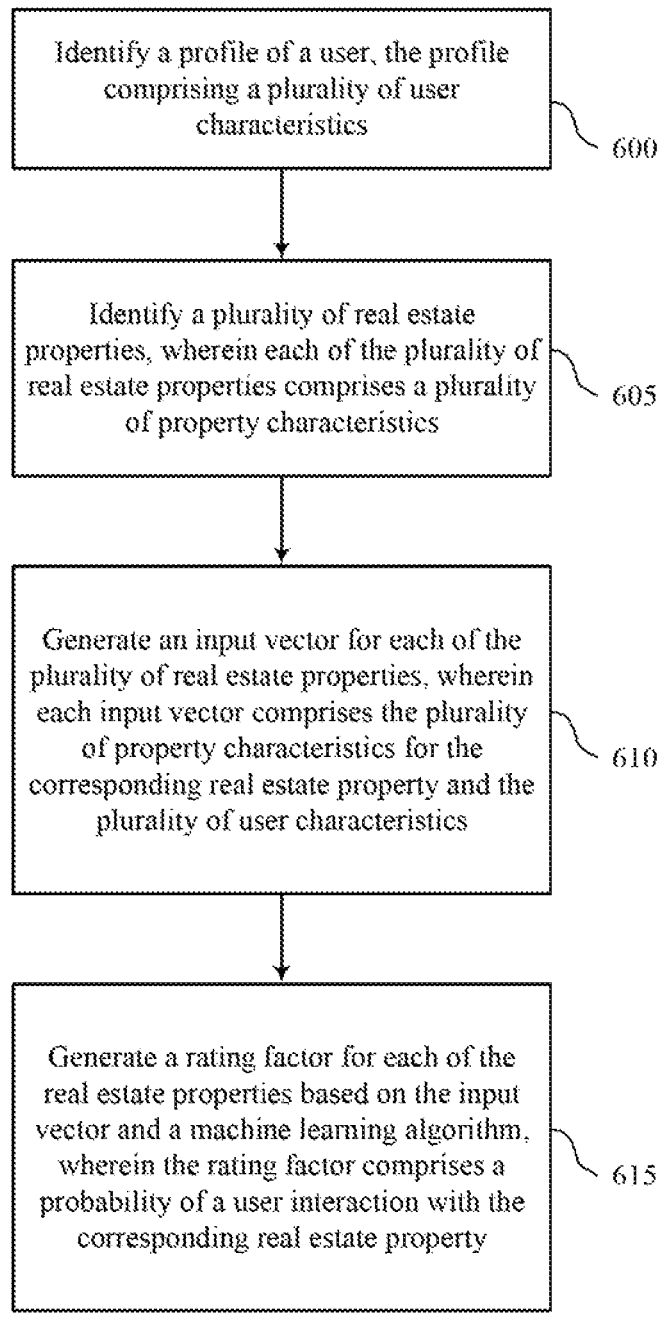
FIG. 6 shows an example of a process for property matching in accordance with aspects of the present disclosure.

FIG. 6 shows an example of a process for property matching in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 600, a system may identify a profile of a user, the profile including a plurality of user characteristics. In some cases, the operations of this step may be performed by an input component as described with reference to FIGS. 2 and 5. The user characteristics (which may also be described as user features) may include both historical user data (i.e., data directly collected from the user) and predictive data.

At step 605, a system may identify a plurality of real estate properties, where each of the plurality of real estate properties includes a plurality of property characteristics. In some cases, the operations of this step may be performed by an input component as described with reference to FIGS. 2 and 5. The property characteristics (which may also be described as property features) may include both historical property data and predictive data.

At step 610, a system may generate an input vector for each of the plurality of real estate properties, where each input vector includes the plurality of property characteristics for the corresponding real estate property and the plurality of user characteristics. In some cases, the operations of this step may be performed by an input component as described with reference to FIGS. 2 and 5.

At step 615, a system may generate a rating factor for each of the real estate properties based on the input vector and a machine learning algorithm, where the rating factor includes a probability of a user interaction with the corresponding real estate property. In some cases, the operations of this step may be performed by a matching component as described with reference to FIG. 2.

Figure 7:
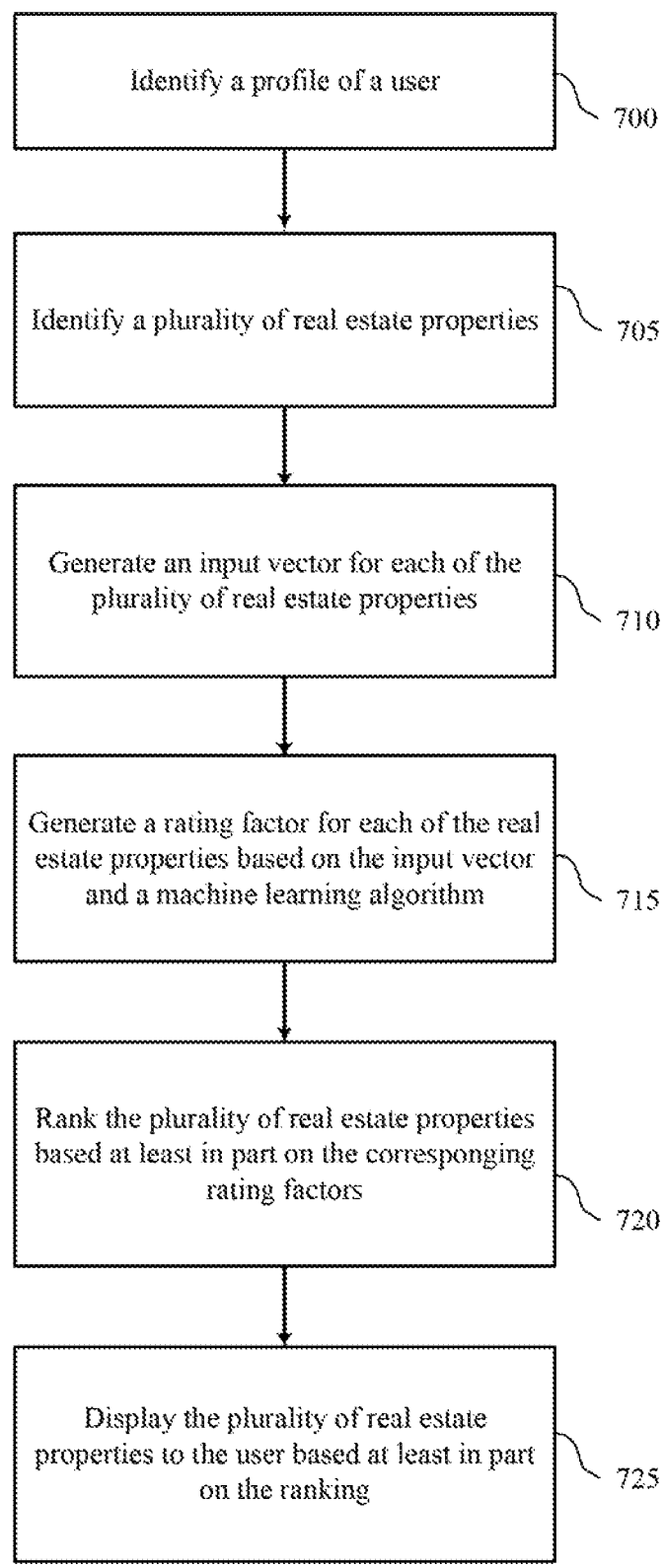
FIG. 7 shows an example of a process for displaying the results of a property matching service in accordance with aspects of the present disclosure.

FIG. 7 shows an example of a process for displaying the results of a property matching service in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 700, a system may identify a profile of a user, the profile including a plurality of user characteristics. In some cases, the operations of this step may be performed by an input component as described with reference to FIGS. 2 and 5.

At step 705, a system may identify a plurality of real estate properties, where each of the plurality of real estate properties includes a plurality of property characteristics. In some cases, the operations of this step may be performed by an input component as described with reference to FIGS. 2 and 5.

At step 710, a system may generate an input vector for each of the plurality of real estate properties, where each input vector includes the plurality of property characteristics for the corresponding real estate property and the plurality of user characteristics. In some cases, the operations of this step may be performed by an input component as described with reference to FIGS. 2 and 5.

At step 715, a system may generate a rating factor for each of the real estate properties based on the input vector and a machine learning algorithm, where the rating factor includes a probability of a user interaction with the corresponding real estate property. In some cases, the operations of this step may be performed by a matching component as described with reference to FIG. 2.

At step 720, a system may rank the plurality of real estate properties based at least in part on the corresponding rating factors. In some cases, the operations of this step may be performed by a matching component as described with reference to FIG. 2.

At step 725, a system may display the plurality of real estate properties to the user based at least in part on the ranking. In some cases, the operations of this step may be performed by a property matching application as described with reference to FIG. 1.

Figure 8:
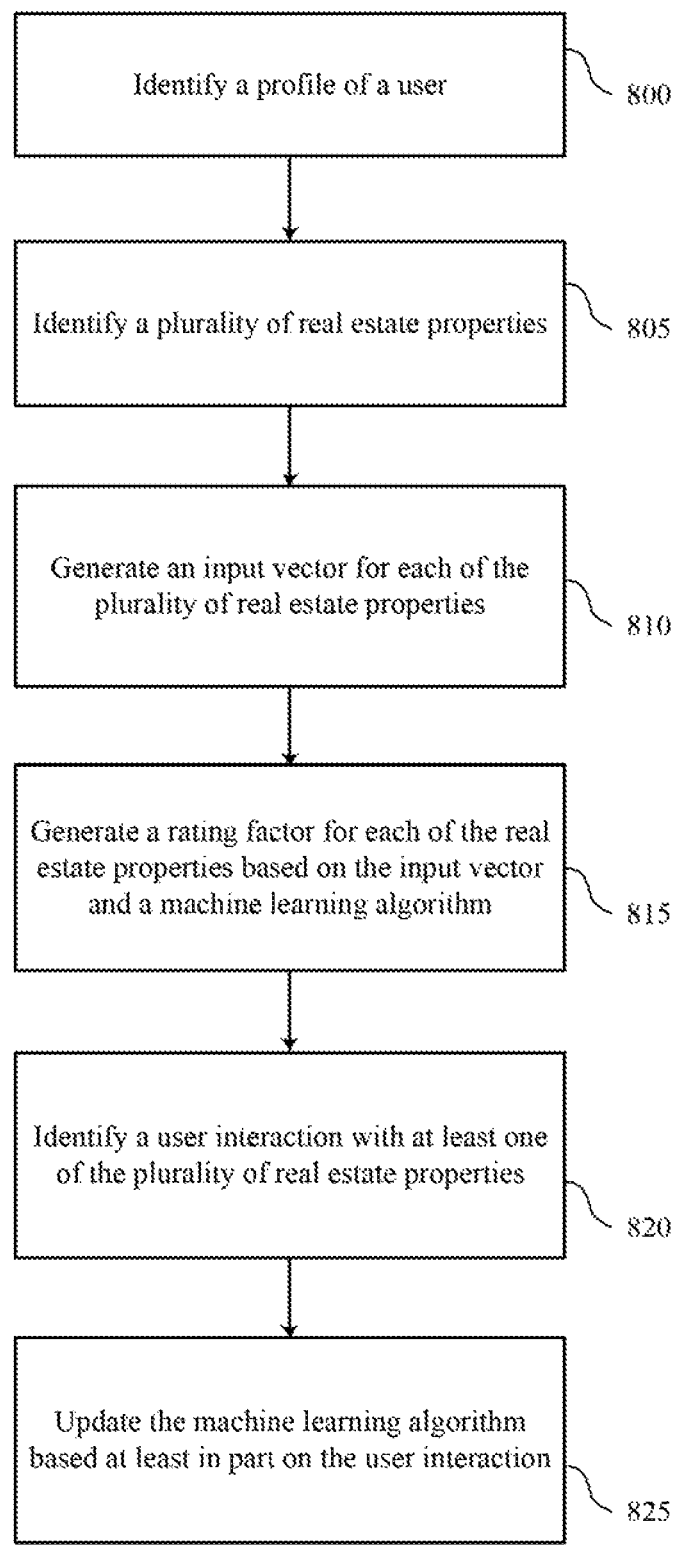
FIG. 8 shows an example of a process for updating a machine learning model in accordance with aspects of the present disclosure.

FIG. 8 shows an example of a process for updating a machine learning model in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 800, a system may identify a profile of a user, the profile including a plurality of user characteristics. In some cases, the operations of this step may be performed by an input component as described with reference to FIGS. 2 and 5.

At step 805, a system may identify a plurality of real estate properties, where each of the plurality of real estate properties includes a plurality of property characteristics. In some cases, the operations of this step may be performed by an input component as described with reference to FIGS. 2 and 5.

At step 810, a system may generate an input vector for each of the plurality of real estate properties, where each input vector includes the plurality of property characteristics for the corresponding real estate property and the plurality of user characteristics. In some cases, the operations of this step may be performed by an input component as described with reference to FIGS. 2 and 5.

At step 815, a system may generate a rating factor for each of the real estate properties based on the input vector and a machine learning algorithm, where the rating factor includes a probability of a user interaction with the corresponding real estate property. In some cases, the operations of this step may be performed by a matching component as described with reference to FIG. 2.

At step 820, a system may identify a user interaction with at least one of the plurality of real estate properties. In some cases, the operations of this step may be performed by a learning component as described with reference to FIG. 2.

At step 825, a system may update the machine learning algorithm based at least in part on the user interaction. In some cases, the operations of this step may be performed by a learning component as described with reference to FIG. 2.

Figure 9:
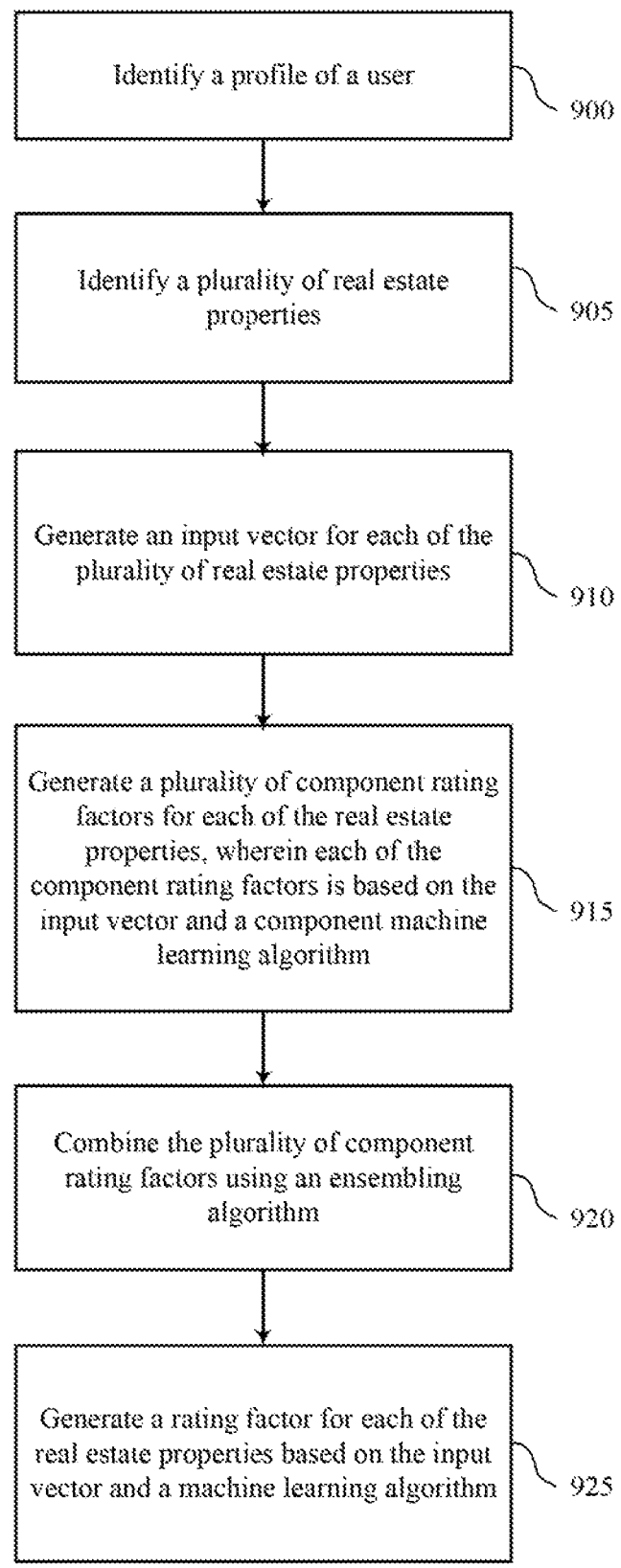
FIG. 9 shows an example of a process for ensembling machine learning models in accordance with aspects of the present disclosure.

FIG. 9 shows an example of a process for ensembling machine learning models in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 900, a system may identify a profile of a user, the profile including a plurality of user characteristics. In some cases, the operations of this step may be performed by an input component as described with reference to FIGS. 2 and 5.

At step 905, a system may identify a plurality of real estate properties, where each of the plurality of real estate properties includes a plurality of property characteristics. In some cases, the operations of this step may be performed by an input component as described with reference to FIGS. 2 and 5.

At step 910, a system may generate an input vector for each of the plurality of real estate properties, where each input vector includes the plurality of property characteristics for the corresponding real estate property and the plurality of user characteristics. In some cases, the operations of this step may be performed by an input component as described with reference to FIGS. 2 and 5.

At step 915, a system may generate a plurality of component rating factors for each of the real estate properties, where each of the component rating factors is based on the input vector and a component machine learning algorithm. In some cases, the operations of this step may be performed by a matching component as described with reference to FIG. 2.

At step 920, a system may combine the plurality of component rating factors using an ensembling algorithm. In some cases, the operations of this step may be performed by a model combiner as described with reference to FIG. 2.

At step 925, a system may generate a rating factor for each of the real estate properties based on the input vector and a machine learning algorithm, where the rating factor includes a probability of a user interaction with the corresponding real estate property. In some cases, the operations of this step may be performed by a matching component as described with reference to FIG. 2.

Figure 10:
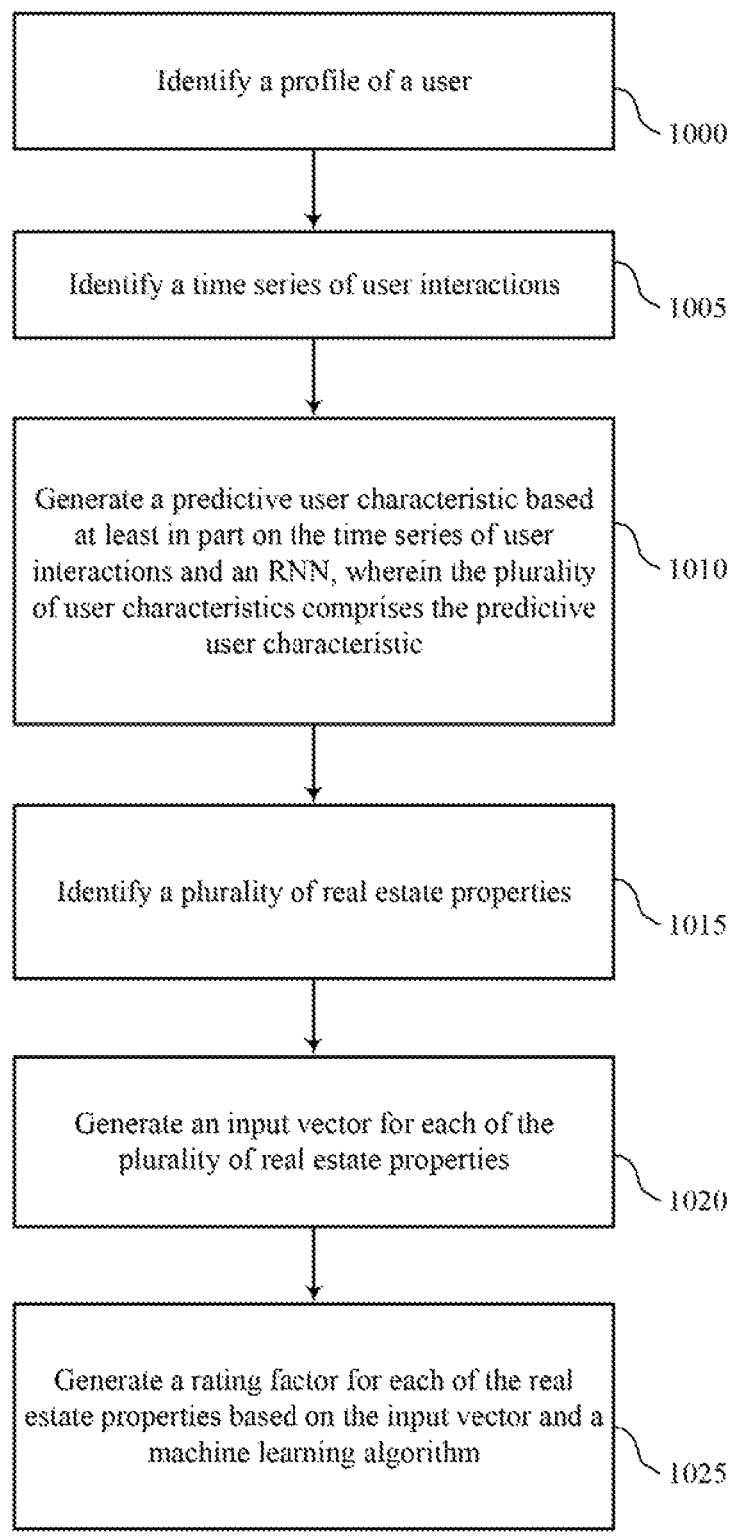
FIG. 10 shows an example of a process for processing user interactions in accordance with aspects of the present disclosure.

FIG. 10 shows an example of a process for processing user interactions in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure, For example, the operations may be composed of various substeps, or may be performed in conjunction with other operations described herein.

At step 1000, a system may identify a profile of a user, the profile including a plurality of user characteristics. In some cases, the operations of this step may be performed by an input component as described with reference to FIGS. 2 and 5.

At step 1005, a system may identify a time series of user interactions. In some cases, the operations of this step may be performed by a recommendation engine as described with reference to FIGS. 1 and 2.

At step 1010, a system may generate a predictive user characteristic based at least in pan on the time series of user interactions and an RNN, where the plurality of user characteristics includes the predictive user characteristic. In some cases, the operations of this step may be performed by a recommendation engine as described with reference to FIGS. 1 and 2.

At step 1015, a system may identify a plurality of real estate properties, where each of the plurality of real estate properties includes a plurality of property characteristics. In some cases, the operations of this step may be performed by an input component as described with reference to FIGS. 2 and 5.

At step 1020, a system may generate an input vector for each of the plurality of real estate properties, where each input vector includes the plurality of property characteristics for the corresponding real estate property and the plurality of user characteristics. In some cases, the operations of this step may be performed by an input component as described with reference to FIGS. 2 and 5.

At step 1025, a system may generate a rating factor for each of the real estate properties based on the input vector and a machine learning algorithm, where the rating factor includes a probability of a user interaction with the corresponding real estate property. In some cases, the operations of this step may be performed by a matching component as described with reference to FIG. 2.

Figure 11:
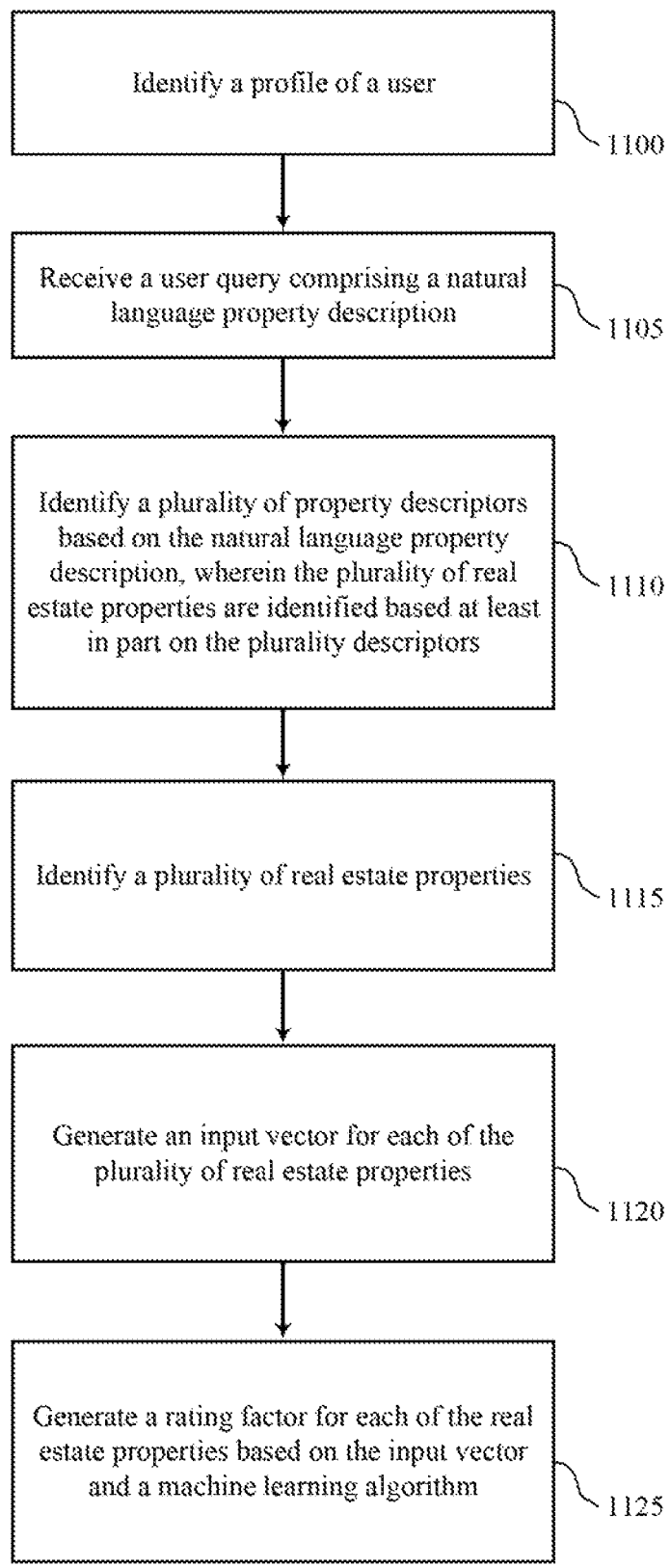
FIG. 11 shows an example of a process for processing a natural language query in accordance with aspects of the present disclosure.

FIG. 11 shows an example of a process for processing a natural language query in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 1100, a system may identify a profile of a user, the profile including plurality of user characteristics. In some cases, the operations of this step may be performed by an input component as described with reference to FIGS. 2 and 5.

At step 1105, a system may receive a user query including a natural language property description. In some cases, the operations of this step may be performed by a query processing engine as described with reference to FIG. 1.

At step 1110, a system may identify a plurality of property descriptors based on the natural language property description, where the plurality of real estate properties are identified based at least in part on the plurality descriptors. In some cases, the operations of this step may be performed by a query processing engine as described with reference to FIG. 1.

At step 1115, a system may identify a plurality of real estate properties, where each of the plurality of real estate properties includes a plurality of property characteristics. In some cases, the operations of this step may be performed by an input component as described with reference to FIGS. 2 and 5.

At step 1120, a system may generate an input vector for each of the plurality of real estate properties, where each input vector includes the plurality of property characteristics for the corresponding real estate property and the plurality of user characteristics. In some cases, the operations of this step may be performed by an input component as described with reference to FIGS. 2 and 5.

At step 1125, a system may generate a rating factor for each of the real estate properties based on the input vector and a machine learning algorithm, where the rating factor includes a probability of a user interaction with the corresponding real estate property. In some cases, the operations of this step may be performed by a matching component as described with reference to FIG. 2.

Figure 12:
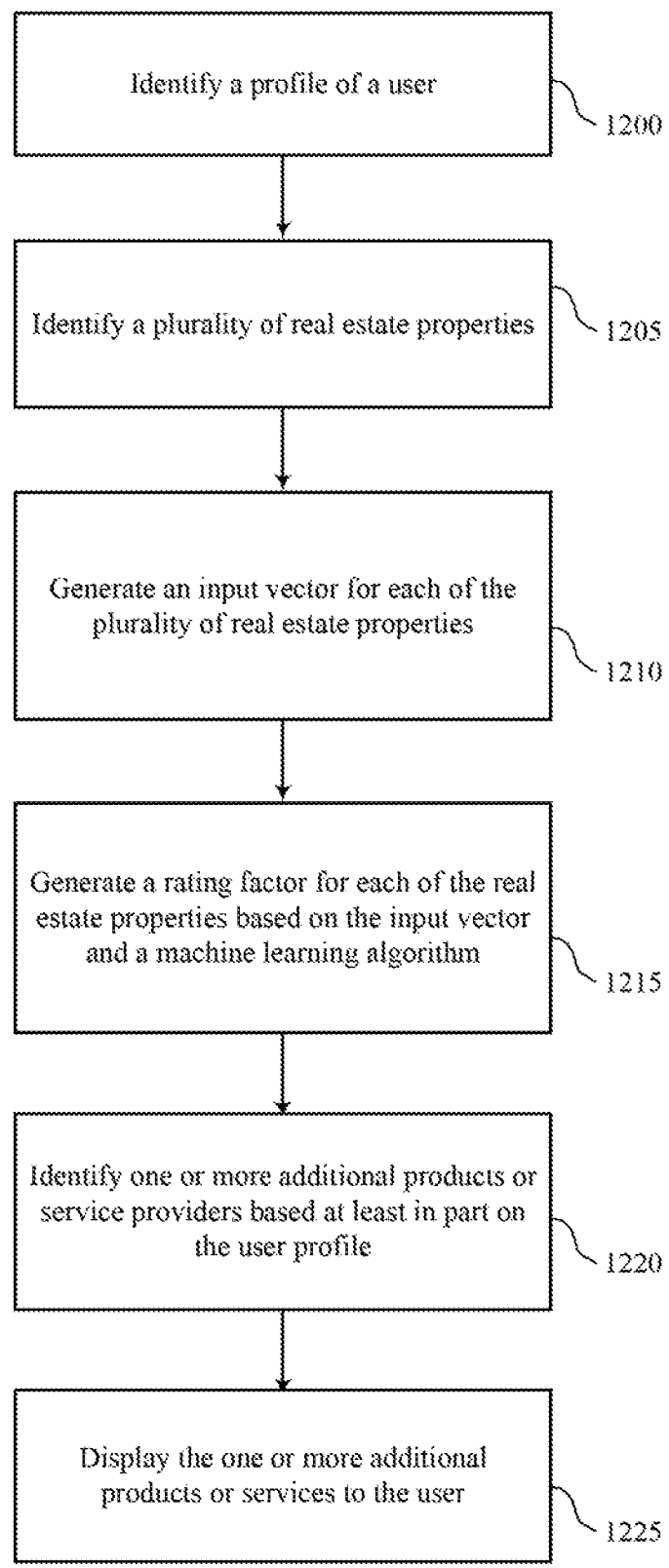
FIG. 12 shows an example of a process for recommending real estate related products and services in accordance with aspects of the present disclosure.

FIG. 12 shows an example of a process for recommending real estate related products and services in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 1200, a system may identify a profile of a user, the profile including a plurality of user characteristics. In some cases, the operations of this step may be performed by an input component as described with reference to FIGS. 2 and 5.

At step 1205, a system may identify a plurality of real estate properties, where each of the plurality of real estate properties includes a plurality of property characteristics. In some cases, the operations of this step may be performed by an input component as described with reference to FIGS. 2 and 5.

At step 1210, a system may generate an input vector for each of the plurality of real estate properties, where each input vector includes the plurality of property characteristics for the corresponding real estate property and the plurality of user characteristics. In some cases, the operations of this step may be performed by an input component as described with reference to FIGS. 2 and 5.

At step 1215, a system may generate a rating factor for each of the real estate properties based on the input vector and a machine learning algorithm, where the rating factor includes a probability of a user interaction with the corresponding real estate property. In some cases, the operations of this step may be performed by a matching component as described with reference to FIG. 2.

At step 1220, a system may identify one or more additional products or service providers based at least in part on the user profile. In some cases, the operations of this step may be performed by a recommendation engine as described with reference to FIGS. 1 and 2.

At step 1225, a system may display the one or more additional products or services to the user. In some cases, the operations of this step may be performed by a property matching application as described with reference to FIG. 1.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may he implemented or performed by devices that include a general-purpose processor, a DSP, an ASIC, an FPGA or other programmable logic device, discrete gate or transistor logic, discrete hardware components, or any combination thereof. A general-purpose processor may he a microprocessor, a conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can include read only memory (ROM), random access memory (RAM), electrically erasable programmable read only memory (EEPROM), compact disk (CD) ROM or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, digital subscriber line (DSL), or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on."

What is claimed is:

1. A method for facilitating real estate transactions, comprising:
    receiving a query for a user;
    identifying a profile of the user, the profile comprising a plurality of user characteristics including a time series of user interactions;
    identifying a plurality of real estate properties based on the query, wherein each of the plurality of real estate properties comprises a plurality of property characteristics including a picture or a visual description;
    encoding the plurality of user characteristics including the time series of user interactions with a recurrent neural network (RNN) by representing the time series of user interactions using at least one hidden layer of neural nodes connected to an output layer of neural nodes to produce a set of user features including predictive user characteristics;
    encoding the plurality of property characteristics to produce a set of property features including predictive property data;
    generating an input vector for each of the plurality of real estate properties by combining the user features and the property features, wherein each input vector represents the plurality of property characteristics for the corresponding real estate property and the plurality of user characteristics including the predictive user characteristics and the predictive property data;
    generating a rating factor for each of the real estate properties based on the input vector and a machine learning algorithm, wherein the rating factor represents a probability of a user interaction with the corresponding real estate property; and
    displaying at least one of the plurality of real estate properties in response to the query.

2. The method of claim 1, further comprising:
    ranking the plurality of real estate properties based at least in part on the corresponding rating factors.

3. The method of claim 1, further comprising:
    identifying a user interaction with at least one of the plurality of real estate properties; and
    updating the machine learning algorithm based at least in part on the user interaction.

4. The method of claim 1, further comprising:
    generating a plurality of component rating factors for each of the real estate properties, wherein each of the component rating factors is based on the input vector and a component machine learning algorithm; and
    combining the plurality of component rating factors using an ensembling algorithm, wherein the rating factor for each of the real estate properties is based at least in part on the combination.

5. The method of claim 1, further comprising:
generating the rating factor for each of the real estate properties comprises multiplying the input vector by a weighting matrix of the machine learning algorithm.

6. The method of claim 1, wherein:
the plurality of user characteristics comprise an age, a location, a family size, a family composition, a set of family ages, an income, a loan eligibility, a work indicator, a preference of living environment, a home ownership indicator, a residence history, a browsing history, a time spent viewing other properties, a time spent using a real estate search platform, a number of times other properties have been visited, a set of user approved properties, or any combination thereof.

7. The method of claim 1, further comprising:
identifying the time series of user interactions; and
generating the predictive user characteristic based at least in part on the time series of user interactions and the recurrent neural network (RNN), wherein the user features comprises the predictive user characteristic.

8. The method of claim 1, wherein:
the rating factor for each of the plurality of real estate properties comprises a similarity rating corresponding to the set of user approved real estate properties.

9. The method of claim 1, wherein:
the plurality of property characteristics for each of the real estate properties further comprises a price, a location, a number of bedrooms, a number of bathrooms, a house style and structure, a house size, a distance from key locations, a school rating, a crime rate, a natural disaster factor, a valuation fluctuation parameter, a surrounding environment, or any combination thereof.

10. The method of claim 1, further comprising:
identifying a plurality of property descriptors based on a natural language property description in the query, wherein the plurality of real estate properties are identified based at least in part on the plurality descriptors.

11. The method of claim 1, further comprising:
identifying one or more real estate market trend indicators, wherein the rating factor for each of the plurality of real estate properties is based at least in part on the one or more market trend indicators.

12. The method of claim 1, further comprising:
identifying one or more similar user pattern indicators and one or more similar needs pattern indicators, wherein the rating factor for each of the plurality of real estate properties is based at least in part on the one or more similar user pattern indicators and the one or more similar needs pattern indicators.

13. The method of claim 1, further comprising:
identifying a property filter; and
selecting the plurality of real estate properties based at least in part on the property filter.

14. The method of claim 1, further comprising:
identifying one or more additional products or service providers based at least in part on the user profile; and
displaying the one or more additional products or services to the user.

15. The method of claim 1, further comprising:
identifying one or more matching users for the user based at least in part on the user profile; and
displaying the one or more matching users to the user.

16. The method of claim 14, wherein:
the one or more additional products or services comprises a household goods product, furniture or interior design, material for renovation, house inspection, mortgage, and service providers including a real estate agent or realtor, a moving service provider, an interior designer, a renovation contractor, a property inspector, a mortgage provider, a neighborhood service or goods provider, or any combination thereof; and
the user comprises a buyer, seller, or renter.

17. The method of claim 1, wherein:
the user interaction comprises clicking on a display element, buying a property, selecting a property, commenting on a property, commenting on a post, or any combination thereof.

18. An apparatus for matching users and properties using artificial intelligence, comprising:
a recurrent neural network (RNN) comprising at least one hidden layer of neural nodes connected to an output layer of neural nodes; and
a processor and a memory storing instructions and in electronic communication with the processor, the processor being configured to execute the instructions to:
identify a profile of a user, the profile comprising a plurality of user characteristics including a time series of user interactions;
identify a plurality of real estate properties, wherein each of the plurality of real estate properties comprises a plurality of property characteristics;
encoding the plurality of user characteristics including the time series of user interactions with the RNN by representing the time series of user interactions using the at least one hidden layer connected to the output layer to produce a set of user features including predictive user characteristics;
encoding the plurality of property characteristics to produce a set of property features including predictive property data;
generate an input vector for each of the plurality of real estate properties by combining the user features and the property features, wherein each input vector comprises the plurality of property characteristics for the corresponding real estate property and the plurality of user characteristics including the predictive user characteristics and the predictive property data; and
generate a rating factor for each of the real estate properties based on the input vector and a machine learning algorithm, wherein the rating factor represents a probability of a user interaction with the corresponding real estate property.

19. The apparatus of claim 18, the processor being further configured to execute the instructions to:
identify a user interaction with at least one of the plurality of real estate properties; and
update the machine learning algorithm based at least in part on the user interaction.

20. A non-transitory computer readable medium storing code for matching users and properties using artificial intelligence, the code comprising instructions executable by a processor to:
identify a profile of a user, the profile comprising a plurality of user characteristics including a time series of user interactions;
identify a plurality of real estate properties, wherein each of the plurality of real estate properties comprises a plurality of property characteristics including a picture or a visual description;
encoding the plurality of user characteristics including the time series of user interactions with a recurrent neural network (RNN) by representing the time series of user interactions using at least one hidden layer of neural nodes connected to an output layer of neural nodes to produce a set of user features including predictive user characteristics;

encoding the plurality of property characteristics to produce a set of property features including predictive property data;

generate an input vector for each of the plurality of real estate properties by combining the user features and the property features, wherein each input vector comprises the plurality of property characteristics for the corresponding real estate property and the plurality of user characteristics including the predictive user characteristics and the predictive property data; and generate a rating factor for each of the real estate properties based on the input vector and an ensemble machine learning algorithm comprising at least two of a Gradient Boosting Tree, a Reverse Boltzman Machine, a Multi-Layer perceptron, an Adaboost, a Random Forest, a Logistic Regression, and a K Nearest Neighbor model, wherein the rating factor comprises a probability of a user interaction with the corresponding real estate property.

\* \* \* \* \*